US009802587B2

(12) United States Patent
Morselli

(10) Patent No.: US 9,802,587 B2
(45) Date of Patent: Oct. 31, 2017

(54) METHOD OF AND APPARATUS FOR CONTROLLING THE BRAKING OF A TRACTOR TRAILER COMBINATION

(71) Applicant: Riccardo Morselli, Modena (IT)

(72) Inventor: Riccardo Morselli, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/654,374

(22) PCT Filed: Dec. 17, 2013

(86) PCT No.: PCT/EP2013/076826
§ 371 (c)(1),
(2) Date: Jun. 19, 2015

(87) PCT Pub. No.: WO2014/095806
PCT Pub. Date: Jun. 26, 2014

(65) Prior Publication Data
US 2015/0336548 A1 Nov. 26, 2015

(30) Foreign Application Priority Data
Dec. 21, 2012 (IT) .............................. MO2012A0320

(51) Int. Cl.
*B60T 8/17* (2006.01)
*B60T 7/20* (2006.01)
(Continued)

(52) U.S. Cl.
CPC .............. *B60T 8/1708* (2013.01); *B60T 7/20* (2013.01); *B60T 8/171* (2013.01); *B60T 11/203* (2013.01); *B60T 8/248* (2013.01)

(58) Field of Classification Search
None
See application file for complete search history.

(56) References Cited

U.S. PATENT DOCUMENTS 5,108,158 A * 4/1992 Breen .................... B60T 8/1708
280/243
5,132,664 A * 7/1992 Feldmann ................. B60T 7/20
188/1.11 R
5,152,544 A * 10/1992 Dierker, Jr. ........... B60T 8/1708
280/432

FOREIGN PATENT DOCUMENTS

DE     3940456    6/1991
DE     4035805    3/1992
(Continued)

OTHER PUBLICATIONS

PCT International Search Report and Written Opinion dated Jan. 21, 2014.

*Primary Examiner* — Krishnan Ramesh
(74) *Attorney, Agent, or Firm* — Rickard K. DeMille; Rebecca L. Henkel

(57) ABSTRACT

A method of controlling the braking of a tractor-trailer combination, in which the tractor includes a drive train having an engine and at least one ground-engaging member driveably connected thereto, at least one ground-engaging member of the tractor includes at least one tractor brake, and at least one ground-engaging member of the trailer includes at least one trailer brake, the operation of which depends at least in part on the operative condition of the at least one tractor brake, includes the steps of, on the initiation of operation of the at least one tractor brake and the at least one trailer brake to brake the tractor-trailer combination, commencing operation of a timer that times the duration of operation of the at least one tractor brake and/or the at least one trailer brake. On a parameter related to the duration of braking effort timed by the timer reaching or exceeding a threshold value, the method then includes adjusting the braking effort applied by the at least one trailer brake in (Continued)

Figure 1:
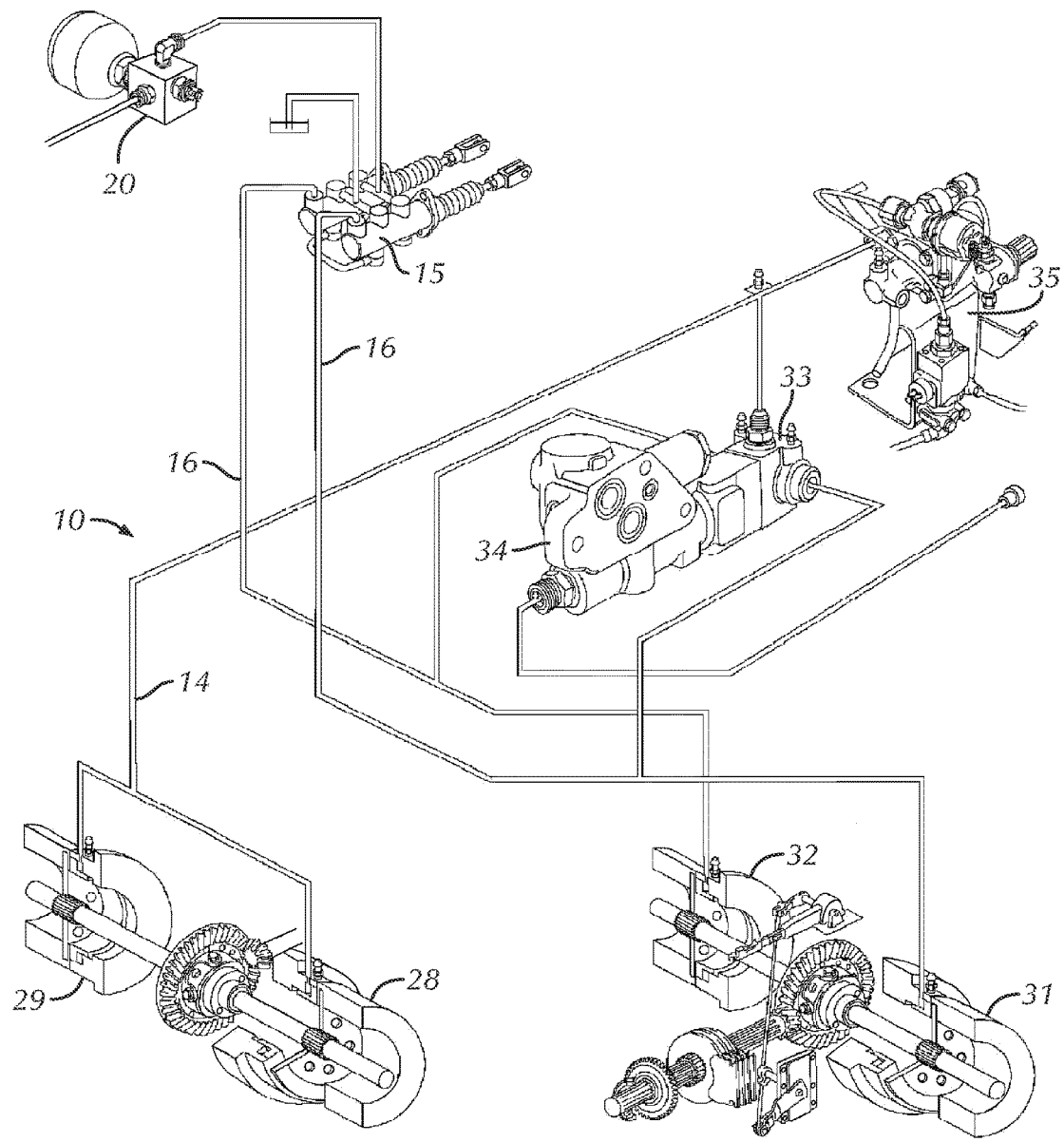

order to achieve or maintain a chosen braking performance of the tractor-trailer combination.

19 Claims, 2 Drawing Sheets

(51) Int. Cl.
*B60T 11/20* (2006.01)
*B60T 8/24* (2006.01)
*B60T 8/171* (2006.01)

(56) References Cited

FOREIGN PATENT DOCUMENTS

| | | |
|---|---|---|
| DE | 4136571 | 3/1993 |
| DE | 19519768 | 12/1996 |
| EP | 0320602 | 6/1989 |
| EP | 0531077 | 3/1993 |
| EP | 1270358 | 1/2003 |
| EP | 1359076 | 11/2003 |
| EP | 2093117 | 8/2009 |
| WO | 9719843 | 6/1997 |
| WO | 2007078230 | 7/2007 |
| WO | 2009075614 | 6/2009 |

\* cited by examiner

METHOD OF AND APPARATUS FOR CONTROLLING THE BRAKING OF A TRACTOR TRAILER COMBINATION

CROSS REFERENCE TO RELATED APPLICATIONS

This application is a national stage of PCT Application No. PCT/EP2013/076826, entitled "METHOD OF AND APPARATUS FOR CONTROLLING THE BRAKING OF A TRACTOR TRAILER COMBINATION", filed on Dec. 17, 2013, which claims priority from and the benefit of Italian Patent Application Serial No. MO2012A000320, filed on Dec. 21, 2012. Each of the foregoing applications is hereby incorporated by reference in its entirety.

BACKGROUND

The invention relates to a method of and apparatus for braking a tractor-trailer combination.

It is well known for agricultural and other tractors to tow trailing vehicles. Numerous examples exist of braked tractor-trailer combinations in many branches of transportation technology. The invention is particularly applicable in the case of an agricultural tractor towing an un-powered trailer such as a grain or beet trailer, hay wagon, baler or similar vehicle that requires the traction of the tractor to effect movement.

The invention is also applicable in other situations in which a trailer is towed. Examples include but are not limited to articulated goods vehicles; combinations of military tractors/cabs and towed vehicles; and two-vehicle forestry and snowmobile trains.

When the tractor or other towing vehicle, as exemplified above, is fitted with four ground-engaging wheels (or other members such as tracks) the invention is useable regardless of whether all four, or just two, of the wheels (or tracks, if present) are driven by the tractor engine.

The foregoing vehicle combinations and types are referred to generally herein as "tractor-trailer combinations". Furthermore as used herein "trailer" means any of a wide range of ground-supported vehicles that may be towed by a tractor that herein is taken to include any powered vehicle that is capable of towing a trailer.

It is known to provide for automatic operation of the brakes of a trailer. This is desirable for example when driver-actuated brake operation might cause a potential jacknife situation.

A potential jacknife situation arises when the tractor braking power exceeds the braking power of the trailer. In such circumstances the trailer may tend to overtake the tractor with the result that a jacknife of the combination may occur. Automation of the level of trailer braking may help to avoid potential jacknife situations, by removing from the driver of a tractor-trailer combination the need to judge the level of braking that is safe.

One mode of use of the brakes of a trailer is so-called "endurance braking". This occurs when the brakes of a trailer forming part of a tractor-trailer combination are activated for an extended period without interruption. This may happen for example when the tractor-trailer combination is required to descend a long hill. Endurance braking may be initiated by an automatic process when for example the tractor operator lifts his foot from the engine governor (throttle) pedal (or releases a hand-operated governor) of the tractor at the start of or during a long descent. Software that is associated with the transmission and/or engine control of the tractor then can cause the trailer brakes to be applied automatically so that the tendency of the trailer to overtake the tractor during the descent is controlled.

When endurance braking occurs however the presence of an automated trailer brake valve may lead to a disadvantage. This manifests itself a brake fade (i.e. a gradual reduction in braking power) in the trailer brakes while endurance braking is effected. This phenomenon is caused e.g. by heat build-up in components of the tractor brake such as the brake pads and discs, and results in a reduction in the braking force or effort applied to the wheels or other ground-engaging members of the tractor.

Trailer brake fade of this kind during endurance braking is potentially dangerous because the tractor operator may not be aware that the trailer brakes have activated on releasing of the engine governor as outlined. In consequence the operator may believe he/she has available the full braking power of the tractor-trailer combination yet depression of the tractor brake pedal in an emergency situation may in fact result in only a limited increase in the braking effort applied by the trailer brakes.

The brake fade may be dangerous also partly because the trailer, being inadequately braked, may induce a jacknife situation as outlined above; and potentially because the dynamic performance of the tractor-trailer combination may alter in ways that the tractor operator may not be able to predict.

It therefore is desirable to provide for a more sophisticated control of the braking of an automatically braked trailer during e.g. endurance braking operations.

BRIEF DESCRIPTION

In accordance with the invention in a first aspect there is provided a method of controlling the braking of a tractor-trailer combination in which the tractor includes a drive train having an engine, at least one ground-engaging member driveably connected to the engine, and at least one tractor brake that is capable of braking forward motion of the tractor; and in which the trailer includes at least one ground-engaging member having at least one further, trailer brake the operation of which depends at least in part on the operative condition of the at least one tractor brake, the method comprising the steps of, on the initiation of operation of the at least one tractor brake and the at least one trailer brake to brake the tractor-trailer combination, commencing operation of a timer that times the duration of operation of the at least one tractor brake and the at least one trailer brake and, on a parameter related to the braking effort timed by the timer reaching or exceeding a threshold value, adjusting the braking effort applied by the at least one trailer brake in order to achieve or maintain a chosen braking performance of the tractor-trailer combination, and/or generating a human-detectable alert that is detectable by an operator of the tractor.

In preferred embodiments of the invention the at least one tractor brake is or includes at least one engine brake (as defined herein) that is capable of acting on the at least one ground-engaging member of the tractor.

Also preferable the human-detectable alert is generated when said timer or parameter related to the braking effort reaches or exceeds said threshold value and wherein said braking effort applied by the at least one trailer brake is adjusted when said timer or parameter related to the braking effort reaches or exceeds a further threshold value, or vice versa.

Preferably the step of adjusting the braking effort applied by the at least one trailer brake includes (temporarily) reducing the braking effort applied by the at least one trailer brake.

Further preferably the step of reducing the braking effort applied by the at least one trailer brake includes at least temporarily reducing the braking effort applied by the at least one trailer brake to zero.

The method of the invention preferably also includes the step of detecting an emergency braking situation and permitting or causing overriding of the prevailing braking effort, in particular to increase the braking effort of the at least one trailer brake, in response thereto.

Conveniently the method includes the step of establishing the threshold value based on the duration of the braking effort timed by the timer and a measure or estimate of the braking force applied by the at least one tractor brake and/or the at least one trailer brake.

Further conveniently the measure of braking force applied by the at least one tractor brake or the at least one trailer brake is based on the pressure of hydraulic or pneumatic fluid in a hydraulic or pneumatic braking line forming part of the tractor-trailer combination.

Preferably the hydraulic or pneumatic braking line is operatively connected to or part of an automatically controlled trailer brake valve (TBV) that controls the braking effort applied by the trailer brake(s). Such a TBV may be of the kind described in EP 1916169 A2, or it may be of a different design.

Preferably the human-detectable alert, when generated, includes one or more selected from the list:
 a) an audible alert;
 b) a visible alert;
 c) a tactile alert;
 d) a reduction in the braking effort of the trailer brake that causes a change in the forward speed of the tractor-trailer combination.

The human-detectable alert may be, for example, the sounding of a chime or other audible alert in the operator cab of the tractor-trailer combination; the illuminating of a lamp in the cab; the displaying of a visible alert via a display panel; combinations of such alerts; or other ways of making the operator of the tractor-trailer combination aware of an adjustment, especially a reduction, of the trailer braking effort. Such other ways may include as indicated causing a reduction in the braking effort of the at least one trailer brake, so that the tractor operator perceives an increase in the speed of the tractor-trailer combination. Such an increase can take the form of a temporary impulse-like increase that causes the operator to become immediately aware of the risk of fade of the trailer brake, and take remedial action such as shifting the vehicle transmission in order to improve control of the vehicle. A temporary reduction in the braking effort of the at least one trailer brake also may provide a chance for the brake components to cool to some extent, thereby helping to reduce the risk of brake fade.

The method also optionally may include the step of terminating the human-detectable alert on increasing of the braking effort of the at least one trailer brake following detection of an emergency braking situation.

It is possible within the scope of the invention for the alert precedence to be reversed so that the alert is detectable only on the increasing of trailer braking effort following detection of an emergency braking situation. It is thought however that an alert that initiates on the reduction, or potential reduction, of trailer braking effort following a period of endurance braking, and that terminates on or following detection of an emergency braking situation that results in an increase in trailer braking effort, is more likely to convey to the operator of a tractor-trailer combination an accurate indication of the prevailing braking conditions.

According to a second aspect of the invention there is provided apparatus, for carrying out a method as defined above, comprising:
 a) a tractor having a drive train including an engine and at least one ground-engaging member driveably connected thereto via an adjustable-ratio transmission, at least one ground-engaging member of the tractor including at least one tractor brake;
 b) a trailer having at least one ground-engaging member that includes at least one further, trailer brake;
 c) an activator for the at least one tractor brake;
 d) an activator for the at least one trailer brake;
 e) a timer for timing operation of the duration of operation of the at least one trailer brake during endurance braking (as defined herein); and
 f) a control device that on a parameter related to the duration of braking effort timed by the timer reaching or exceeding a threshold value, initiates adjustment of the braking effort applied by the at least one trailer brake and/or generates a human-detectable alert that is detectable by an operator of the tractor.

Preferably the adjustment of the braking effort applied by the at least one trailer brake is a reduction, in particular but not necessarily to zero, in the braking effort applied by the at least one trailer brake.

Conveniently the apparatus includes a detector for detecting an emergency braking situation, the control device permitting overriding of the prevailing braking effort, in particular to increase the braking effort of the at least one trailer brake, in response thereto.

Further preferably the control device establishes the threshold value based on the duration of the braking effort timed by the timer and a measure of the braking force applied by the at least one tractor brake and/or the at least one trailer brake.

In a particularly preferred embodiment of the invention the control device is programmable so as to permit variation of at least the value of the parameter.

Further conveniently the control device bases the measure of braking force applied by the at least one tractor brake or the at least one trailer brake on the pressure of hydraulic or pneumatic fluid in a hydraulic or pneumatic braking line forming part of the tractor-trailer combination.

In consequence preferred embodiments of the apparatus of the invention include at least one pressure sensor that measures the pressure of hydraulic or pneumatic fluid in a said hydraulic or pneumatic braking line; and the control device includes at least one processor for processing the output of the pressure sensor and determining a pressure value signal therefrom.

In preferred embodiments of the invention the hydraulic or pneumatic braking line is operatively connected to or part of an automatically controlled trailer brake valve (TBV). This may be as outlined above.

The control device of the apparatus of the invention optionally may generate the human-detectable alert as one or more selected from the list:
 a) an audible alert;
 b) a visible alert;
 c) a tactile alert;
 d) a reduction in the braking effort of the trailer brake that causes a change in the forward speed of the tractor-trailer combination.

Preferably the human-detectable alert terminates on increasing of the braking effort of the at least one trailer brake following detection of an emergency braking situation.

DRAWINGS

Figure 2:
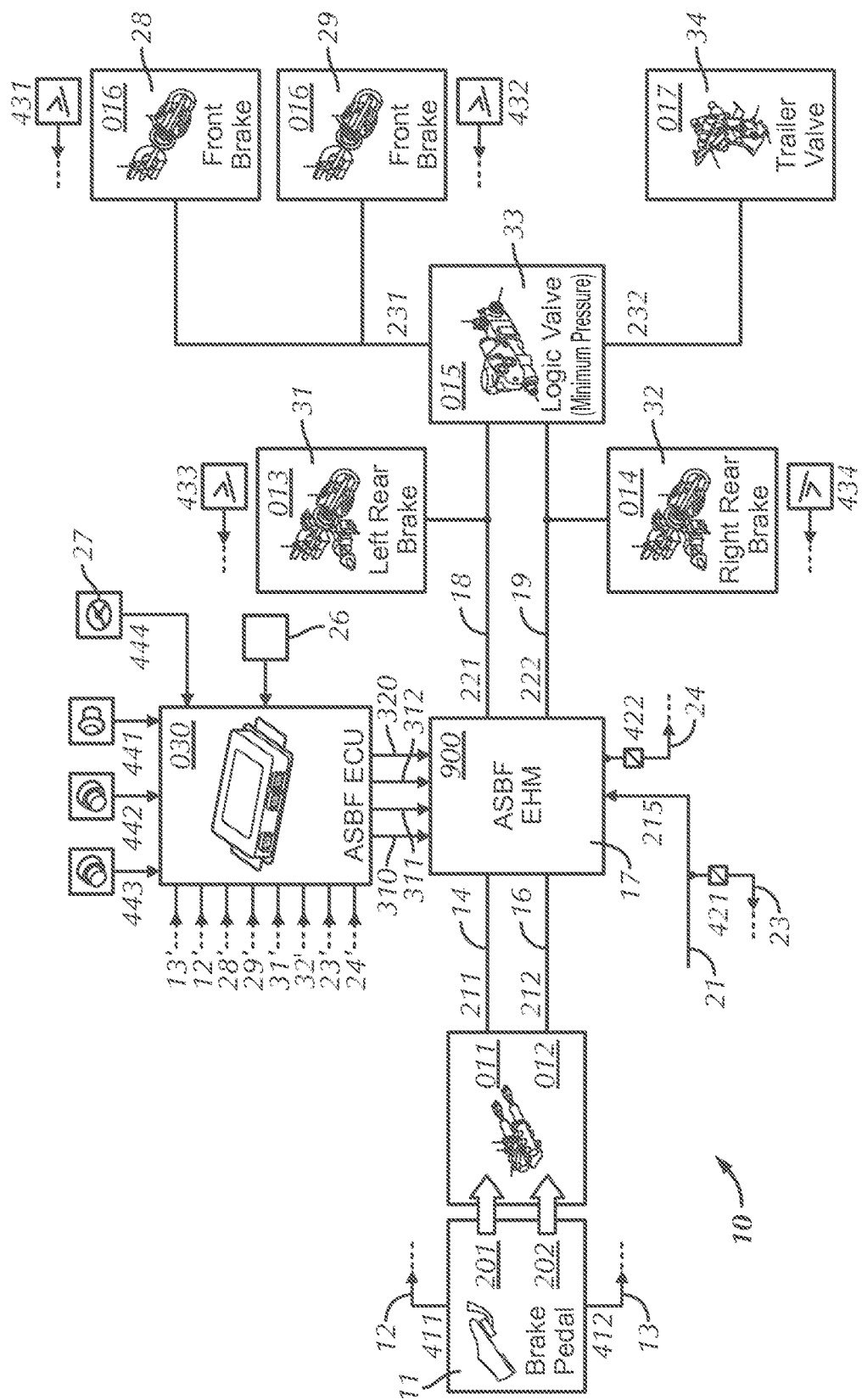

There now follows a description of preferred embodiments of the invention, by way of non-limiting example, with reference being made to the accompanying drawings in which:

FIG. 1 shows in schematic view the key parts of one form of hydraulic-pneumatic tractor braking circuit that is suitable for providing braking of a braked trailer that is towed by the tractor; and FIG. 2 shows in schematic form a control arrangement that is suitable for controlling the circuit of FIG. 1 that may be configured according to the invention, and that may be operated in accordance with the method of the invention.

DETAILED DESCRIPTION

In FIG. 1 a hydraulic-pneumatic braking circuit 10 is shown that provides for hydraulic braking of a tractor and hydraulic or pneumatic braking of a towed trailer. The principles of the invention however are equally applicable in the case of an exclusively hydraulic or an exclusively pneumatic braking circuit, or even an electric vehicle brake arrangement.

FIG. 1 shows the essential parts of a braking system of a tractor-trailer combination in which the tractor has an engine, a drive train and at least one ground-engaging member such as a wheel or track. These components however are for clarity omitted from FIG. 1.

These parts of the apparatus of the invention may take any of a wide range of forms. One type of tractor to which the invention is particularly applicable is an agricultural tractor having a large, high-torque output diesel engine that is driveably connected to driven, rotatable rear wheels of large diameter by way of a number of drive train components including a transmission that could be a conventional, manual gearbox, a semi- or full-powershift transmission or a constantly variable transmission (CVT). The transmission also could be a hydrostatic drive, although tractors including these are not used for towing operations as commonly as the other types mentioned.

As stated moreover many other forms of tractor are also possible within the scope of the invention. Therefore many variants on the types of drive train, engine and ground-engaging member are also possible.

In the figures a brake pedal 11 provides operator-derived control inputs to braking components supported by and acting to brake the tractor of the tractor-trailer combination.

The brake pedal 11 acts on a brake master cylinder 15 of per se known design that is connected in a hydraulic circuit. The hydraulic circuit receives pressurised hydraulic fluid from a source such as a pump and reservoir or, as illustrated in FIG. 1, an accumulator/top-up reservoir that is in turn fed from a pump.

The master cylinder 15 is such as to control, on depression of the brake pedal 11, the supply of hydraulic fluid in (depending on the split in the circuit) left and right and/or front and rear hydraulic lines 14, 16 so as to operate the front and rear left and right tractor wheel brakes 28, 29, 31, 32 in a per se known manner. The braking effort is proportional to the degree of depression of the pedal 11.

As illustrated the master cylinder as configured in FIG. 1, although other arrangements are possible within the scope of the invention, also feeds hydraulic brake fluid under pressure to a logic valve 33, a hydraulic trailer brake control valve 34 and a hydraulically actuated pneumatic trailer brake valve 35. The arrangement is such that the brakes of the trailer that is hitched to the tractor may be controlled in a per se known manner, depending on the design of the trailer brakes as between hydraulic and pneumatic types, in a way that is dependent on operation of the hydraulic tractor brake circuit.

In the embodiment illustrated the brake pedal 11 is furthermore arranged to generate electrical braking signals, by way of respective switches 12, 13 that are visible in FIG. 2.

Activation of the braking circuit 10 however does not represent the only method of braking the tractor-trailer combination however. On the contrary, engine braking may also be employed; and this is the primary source of tractor braking during endurance braking operations.

By way of explanation, the torque of a tractor engine is high; the rotating parts of the drivetrain parts have a high values of rotational inertia; and the driven (usually) rear wheels of an agricultural tractor are of large diameter. The combined effect of these factors when the governor of a tractor engine is released by the operator of the tractor is to cause a significant engine braking effect. This is routinely made use of by tractor operators, especially when endurance braking is called for.

The trailer also includes at least one ground-engaging member that typically is a rotatable wheel. More probably the trailer would include one or more pairs of wheels with the members of each pair supporting opposite sides of the trailer so as to permit movement of the trailer when it is towed by the tractor.

The trailer includes one or more trailer brakes that effect braking of the trailer.

Typically the or each trailer brake operates to brake rotation of the ground-engaging member of the trailer, although the trailer brake may take other forms in variants of the invention. FIG. 1 contemplates the possibility, also within the scope of the invention, of the trailer brake being either a hydraulically activated brake or a pneumatically operated brake, thereby conferring variability on the types of trailer that may be hitched to the tractor. In other embodiments of the invention however simpler braking systems may exist.

Regardless of the precise design of the trailer brake the arrangement is such that activation of the trailer brake under normal circumstances depends on the state of operation of the tractor brake. This is achieved by reason of the tractor brake pedal 11 being operatively connected as described to the respective electrical proportional switches 12, 13 provide electrical control inputs to an electrohydraulic control module 17. Trailer brakes however may also be activated in response to engine braking as anti-Jackknifing measure. This is achieved in the embodiment of the invention by a foot- or hand-operated governor control being released without the brake pedal 11 being depressed triggering activation of the trailer brakes.

Electrohydraulic control module 17 is a control module that converts electrical inputs to pressure of (in the example of FIG. 2) incompressible hydraulic braking fluid in a pair of left and right side hydraulic lines 18, 19 so as to activate the pads or shoes of brakes connected to the hydraulic line and thereby activate the brakes in proportion to the extent to which the associated brake pedal is depressed.

The electrohydraulic control module 17 is supplied with pressurised brake fluid via a hydraulic line 21 from the source which may be as described with reference to FIG. 1 above. The supply pressure of fluid is monitored by a sensor 23 that generates an electrical signal.

Electrohydraulic control module 17 also is operatively (i.e. electrically) connected to programmable electronic control unit (ECU) 30 that determines how the electrohydraulic control module behaves, depending on various settings of the braking system 10 and the prevailing conditions.

ECU 30 is programmable in two ways, firstly at the level of firmware installed and configured during manufacture of the braking system 10; and secondly at the level of in use settable parameters that may adjust to suit the usage of the tractor-trailer combination and e.g. prevailing ground conditions.

To the latter end the braking system 10 includes a number of inputs to the ECU 30.

The majority of the inputs are sensor-derived and can cause adjustment of the parameters of the braking system 10 in response to conditions prevailing in the tractor-trailer combination.

Thus the inputs include for example sensors determining the amount of wheel slip experienced at the driven, ground engaging wheels of the tractor; the steering angle of steerable wheels typically forming part of the tractor as represented by numeral 27; and numerous other inputs. Signals 28', 28', 31', 32' representing the braking effort applied to the front and rear left and right tractor wheel brakes 28, 29, 31, 32 also are input to ECU 30.

The electrical signals from the switches 12, 13 also are fed forward to the ECU as inputs designated by the specific reference numerals 12', 13' in FIG. 1. The pressure signal generated by supply pressure sensor 23 is fed as an input to ECU 30 as signified by reference numeral 23'. A controlled pressure sensor 24 monitors the output fluid pressure generated in module 17 and feeds a signal representative of this to ECU 30 as input 24'.

The inputs also cater for one or more user-settable parameters. Thus a throttle-activated switch 26 may be present for example for the purpose of switching between a non-endurance braking mode (in which the method of the invention is not put into effect) and an endurance braking mode in which the features of the invention are available in order to modify the braking action experienced by the tractor-trailer combination. The switch may be arranged to initiate the endurance braking mode, as described below, when as explained above a foot- or hand-operated governor control is released without the brake pedal 11 being depressed, with the result that engine braking of the drivetrain of the tractor occurs as outlined, while the at least one trailer brake is activated.

The hydraulic lines 18, 19 supply hydraulic fluid to logic valve 33 that determines the distribution of hydraulic fluid as between on the one hand the front wheel brakes 28, 29 of the tractor and on the other hand trailer brake valve 34 or 35 that in turn supplies brake fluid under pressure to the trailer brakes (hydraulic valve 34) or that controls the supply of pneumatic fluid to the trailer brakes (pneumatic valve 35).

The electrohydraulic control module as a result of the described arrangement is capable of independently controlling the brakes of the tractor and the trailer brake.

The logic valve 33 and the trailer brake valve 34/35 are electrohydraulic units that are controlled by signals generated in the ECU 30. This permits the braking performance of the tractor brake and the trailer brake respectively to be altered independently of one another, as desired in accordance with the method of the invention.

ECU 30 includes a timer that may be e.g. a hardware timer or a software timer. This timer may operate automatically in the event of an endurance braking mode of operation being selected through switching of switch 26 in turn as a result of releasing of the governor control as aforesaid.

Once the timer commences operation it times the period for which braking takes place continuously (or perhaps, depending on the firmware programming, if only very brief interruptions of less than a predetermined duration occur). If the period of uninterrupted endurance braking (or if available barely interrupted braking) exceeds a predetermined threshold value the ECU then in accordance with the invention may adjust the braking effort applied via the tractor and trailer brake.

In more detail the ECU 30 in such a situation may cause a reduction in the braking effort applied by the trailer brake, by reducing the fluid pressure allocated to the trailer brake valve 34 from the logic valve 33 or by commanding the pneumatic valve 35 to reduce the braking pressure. Preferably the reduction in the trailer brake effort is to zero, at least temporarily.

The ECU also however is capable of detecting an emergency braking situation, for example by sensing using pressure sensor 24 a sudden increase in the brake fluid pressure acting to operate the tractor brake(s), or through use of an accelerometer that detects a sudden deceleration of the tractor-trailer combination.

Such sensors and accelerometers can be arranged to provide inputs to the ECU that may be programmed for example to treat a rise in brake fluid pressure to a threshold level within a predetermined short time period as an emergency braking situation.

Other ways of detecting emergency braking also are known and will occur to the worker of skill in the art.

On detecting an emergency braking situation the ECU in accordance with a refinement of the method of the invention may cause re-activation of the trailer brake in the event of the reduction in trailer braking effort described above prevailing at the time the emergency braking situation is detected.

The threshold period referred to above is calculated based on information about the pressure of brake fluid in the hydraulic lines 18, 19, and the duration of the at least one trailer brake being activated.

This arrangement permits the method and apparatus of the invention to some extent to be self-adjusting, in the sense that a high braking effort over a short period may produce the same amount of potential fade in the trailer brakes as would a longer period of less intense braking. Basing the calculation of the threshold value on such a combination of parameters allows the apparatus of the invention to vary the reduction in trailer braking effort in order to take account of variations in the brake usage pattern.

In a further refinement the ECU of the invention may generate a human-detectable alert that alerts an operator of the tractor-trailer combination to a potential reduction, as a result of brake fade caused by endurance braking, in the braking effort applied by the trailer brake(s) in accordance with the principles described herein.

Such an alert may be a chime or buzzer that sounds in the cab of the tractor to inform the operator that the trailer brake effort has been reduced. Additionally or alternatively the alert may take the form of a slight reduction in the braking effort of the trailer, such that the speed of the tractor-trailer combination increases perceptibly while endurance braking takes place. This can notify the operator of the tractor with some immediacy that the braking performance of the trailer may have become compromised. The operator then can perform a safety manoeuvre such as using the tractor brakes through depressing the brake pedal 11, or he may simply know as a result of the alert to exercise caution when next depressing the brake pedal 11. Such alerts as described can be arranged to terminate on the detection of an emergency braking situation, as described above, that results in restoration of the trailer braking effort.

Overall the method and apparatus of the invention solve a significant safety problem extant in the use of tractor-trailer combinations.

In certain situations it may be advisable to generate a human-detectable alert while the trailer brakes continue normal working operation when the timer or parameter related to the braking effort reaches or exceeds the threshold. Only when said timer or parameter related to the braking effort reaches or exceeds a further, higher threshold fading of said at least one trailer brake may be simulated by adjusting the braking effort applied by the at least one trailer brake in addition to the generation of the human-detectable alert. Or vice versa. In other situations both the human-detectable alert is generated and said braking effort applied by the at least one trailer brake is adjusted simultaneously when said timer or parameter related to the braking effort reaches or exceeds said threshold value.

Variants on the features and aspects of the invention as described herein are possible. Thus for example the features described herein as relating to a hydraulic braking system may in other embodiments of the invention be replaced by counterpart components permitting the system to be embodied as a pneumatic, electric or even mechanically (e.g. cable- or rod-) actuated braking system.

Furthermore even when configured as a hydraulic system as illustrated the system may include more or fewer of the sensors providing inputs to the ECU 30, with many of the illustrated sensors being exemplary only and hence optional; and also with the number and purpose of the brake valves varying in other embodiments of the invention.

The listing or discussion of an apparently prior-published document in this specification should not necessarily be taken as an acknowledgement that the document is part of the state of the art or is common general knowledge.

The invention claimed is:

1. A method of controlling braking of a tractor-trailer combination, in which the tractor includes a drive train having an engine, at least one ground-engaging member driveably connected to the engine, and at least one tractor brake that is capable of braking forward motion of the tractor, and in which the trailer includes at least one ground-engaging member having at least one trailer brake, the operation of which depends at least in part on the operative condition of the at least one tractor brake, the method comprising the steps of:
    on the initiation of operation of the at least one tractor brake and the at least one trailer brake to brake the tractor-trailer combination, commencing operation of a timer that times a duration of operation of the at least one tractor brake and the at least one trailer brake; and
    adjusting a braking effort applied by the at least one trailer brake, generating a human-detectable alert that is detectable by an operator of the tractor, or a combination thereof, upon the duration of operation reaching or exceeding a threshold value, wherein the threshold value is based on the duration of operation and a measure or estimate of a braking force applied by the at least one tractor brake and the at least one trailer brake.

2. The method of claim 1, wherein the at least one tractor brake is or includes at least one engine brake that is capable of acting on the at least one ground-engaging member of the tractor.

3. The method of claim 1, wherein the human-detectable alert is generated when the threshold value is reached or exceeded, and the braking effort applied by the at least one trailer brake is adjusted when a further threshold value is reached or exceeded, or wherein the braking effort applied by the at least one trailer brake is adjusted when the threshold value is reached or exceeded, and the human-detectable alert is generated when the further threshold value is reached or exceeded.

4. The method of claim 1, wherein adjusting the braking effort applied by the at least one trailer brake includes reducing the braking effort applied by the at least one trailer brake, if the braking effort is adjusted.

5. The method of claim 4, wherein reducing the braking effort applied by the at least one trailer brake includes at least temporarily reducing the braking effort applied by the at least one trailer brake to zero, if the braking effort is adjusted.

6. The method of claim 4, comprising detecting an emergency braking situation and permitting or causing overriding of a prevailing braking effort.

7. The method of claim 1, wherein the measure of braking force applied by the at least one tractor brake or the at least one trailer brake is based on a pressure of hydraulic or pneumatic fluid in a hydraulic or pneumatic braking line forming part of the tractor-trailer combination.

8. The method of claim 1, wherein the human-detectable alert includes one or more selected from the list:
    a) an audible alert;
    b) a visible alert;
    c) a tactile alert; and
    d) a reduction in the braking effort of the trailer brake that causes a change in the forward speed of the tractor-trailer combination.

9. An apparatus, comprising:
    a tractor having a drive train including an engine and at least one ground-engaging member driveably connected thereto via an adjustable-ratio transmission, the tractor including at least one tractor brake that is capable of braking forward motion of the tractor;
    a trailer having at least one ground-engaging member that includes at least one trailer brake;
    an activator for the at least one tractor brake;
    an activator for the at least one trailer brake;
    a timer for timing a duration of operation of the at least one trailer brake during endurance braking; and
    an electronic control unit (ECU) configured to initiate adjustment of the braking effort applied by the at least one trailer brake, to generate a human-detectable alert that is detectable by an operator of the tractor, or a combination thereof, upon the duration of operation reaching or exceeding a threshold value, wherein the threshold value is based on the duration of operation and a measure or estimate of a braking force applied by the at least one tractor brake and the at least one trailer brake.

10. The apparatus of claim 9, wherein the at least one tractor brake is or includes at least one engine brake that is capable of acting on the at least one ground-engaging member of the tractor.

11. The apparatus of claim 10, wherein the human-detectable alert is generated when the threshold value is reached or exceeded, and the braking effort applied by the at least one trailer brake is adjusted a further threshold value is reached or exceeded, or wherein the braking effort applied by the at least one trailer brake is adjusted when the threshold value is reached or exceeded, and the human-detectable alert is generated when the further threshold value is reached or exceeded.

12. The apparatus of claim 9, wherein the ECU on adjusting the braking effort applied by the at least one trailer brake is configured to cause a reduction in the braking effort applied by the at least one trailer brake, if the braking effort is adjusted.

13. The apparatus of claim 12, wherein the reduction in the braking effort applied by the at least one trailer brake includes a reduction at least temporarily to zero, if the braking effort is adjusted.

14. The apparatus of claim 9, including a detector for detecting an emergency braking situation, and wherein the ECU is configured to permit or cause overriding of a prevailing braking effort of the at least one trailer brake in response thereto.

15. The apparatus of claim 9, wherein the ECU is programmable so as to permit variation of at least a value of the threshold value.

16. The apparatus of claim 9, wherein the ECU is configured to base a measure of braking force applied by the at least one tractor brake or the at least one trailer brake on a pressure of hydraulic or pneumatic fluid in a hydraulic or pneumatic braking line.

17. The apparatus of claim 16, including at least one pressure sensor that measures the pressure of hydraulic or pneumatic fluid in the hydraulic braking line, and wherein the ECU includes at least one processor for processing the output of the pressure sensor and determining a pressure value signal therefrom.

18. The apparatus of claim 9, wherein the ECU is configured to generate the human-detectable alert as one or more selected from the list:
   a) an audible alert;
   b) a visible alert;
   c) a tactile alert; and
   d) a reduction in the braking effort of the trailer brake that causes a change in the forward speed of the tractor and the trailer.

19. The apparatus of claim 18, wherein the human-detectable alert terminates on increasing of the braking effort of the at least one trailer brake following detection of an emergency braking situation.

* * * * *